US011881388B2

(12) United States Patent
Hager

(10) Patent No.: US 11,881,388 B2
(45) Date of Patent: Jan. 23, 2024

(54) FOURIER TRANSFORM MASS SPECTROMETERS AND METHODS OF ANALYSIS USING THE SAME

(71) Applicant: DH TECHNOLOGIES DEVELOPMENT PTE. LTD., Singapore (SG)

(72) Inventor: James W Hager, Mississauga (CA)

(73) Assignee: DH Technologies Development Pte. Ltd., Singapore (SG)

( * ) Notice: Subject to any disclaimer, the term of this patent is extended or adjusted under 35 U.S.C. 154(b) by 208 days.

(21) Appl. No.: 17/427,206

(22) PCT Filed: Jan. 28, 2020

(86) PCT No.: PCT/IB2020/050655
§ 371 (c)(1),
(2) Date: Jul. 30, 2021

(87) PCT Pub. No.: WO2020/157654
PCT Pub. Date: Aug. 6, 2020

(65) Prior Publication Data

US 2022/0148873 A1 May 12, 2022

Related U.S. Application Data

(60) Provisional application No. 62/800,379, filed on Feb. 1, 2019.

(51) Int. Cl.
*H01J 49/00* (2006.01)
*H01J 49/42* (2006.01)
(Continued)

(52) U.S. Cl.
CPC ...... *H01J 49/4215* (2013.01); *H01J 49/0031* (2013.01); *H01J 49/24* (2013.01); *H01J 49/36* (2013.01)

(58) Field of Classification Search
CPC ........ H01J 49/004; H01J 49/009; H01J 49/24; H01J 49/36; H01J 49/38; H01J 49/063;
(Continued)

(56) References Cited

U.S. PATENT DOCUMENTS

2015/0155147 A1* 6/2015 Makarov ............ H01J 49/0063 250/282
2021/0134573 A1* 5/2021 Hager ................ H01J 49/0031

FOREIGN PATENT DOCUMENTS

WO 2018142265 A1 8/2018

OTHER PUBLICATIONS

International Search Report and Written Opinion for PCT/IB2020/050655 dated Mar. 27, 2020.
(Continued)

*Primary Examiner* — David E Smith
*Assistant Examiner* — Hsien C Tsai

(57) ABSTRACT

Methods and systems for FTMS-based analysis having an improved duty cycle relative to conventional FTMS techniques are provided herein. In various aspects, the methods and systems described herein operate on a continuous ion beam, thereby eliminating the relatively long duration trapping and cooling steps associated with Penning traps or orbitraps of conventional FTMS systems, as well as provide increased resolving power by sequentially interrogating the continuous ion beam under different radially-confining field conditions.

20 Claims, 9 Drawing Sheets

FIG. 1

(51) Int. Cl.
*H01J 49/24* (2006.01)
*H01J 49/36* (2006.01)

(58) Field of Classification Search
CPC .... H01J 49/0031; H01J 49/426; H01J 49/427; H01J 49/4215; H01J 49/4225
See application file for complete search history.

(56) References Cited

OTHER PUBLICATIONS

Andrew D. Southam et al; "Dynamic Range and Mass Accuracy of Wide-Scan Direct Infusion Nanoelectrospray Fourier Transform Ion Cyclotron Resonance Mass Spectrometry-Based Metabolomics Increased by the Spectral Stitching Method", Analytical Chemistry, vol. 79, No. 12, May 19, 2007, pp. 4595-4602.

* cited by examiner

FOURIER TRANSFORM MASS SPECTROMETERS AND METHODS OF ANALYSIS USING THE SAME

RELATED APPLICATION

This application claims priority to U.S. provisional application No. 62/800,379 filed on Feb. 1, 2019, entitled "Fourier Transform Mass Spectrometers and Methods of Analysis Using the Same," which is incorporated herein by reference in its entirety.

FIELD

The present teachings are generally related to a mass analyzer for use in mass spectrometry (MS) and, more particularly, to a Fourier transform mass analyzer and methods for operating the same.

BACKGROUND

Mass spectrometry (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

A Fourier transform is a mathematical algorithm that is used to transform a time-domain signal into the frequency domain or vice versa. In known techniques of Fourier transform mass spectrometry (FTMS), ions are excited and their oscillations are measured in the time domain. A Fourier transform is then used to transform the measured time domain oscillations of the ions into the frequency domain. Since the frequency of the oscillation of an ion is inversely proportional to the mass-to-charge ratio (m/z) of the ion, the frequencies found from the Fourier transform are converted to m/z values and a mass spectrum is produced.

Though FTMS can sometimes provide better resolving power and mass accuracy than other types of mass spectrometry, there remains a need for improved FTMS systems and methods providing improved resolution, sensitivity, and/or speed.

SUMMARY

In accordance with various aspects of the present teachings, improved methods and systems for performing FTMS are disclosed. Whereas known techniques of FTMS generally require relatively long steps for trapping and cooling ions prior to causing their excitation, various embodiments of the methods and systems disclosed herein provide one or more excitation pulses to a continuous ion beam being transmitted through a radially-confining field exhibiting a fixed RF amplitude, thereby significantly improving the analytical duty cycle by removing the time associated with conventional FTMS techniques utilizing such trapping/cooling steps. Moreover, in various aspects, the continuous ion beam may be interrogated and subject to FTMS by sequentially subjecting the ion beam to excitation pulses under different radially-confining field conditions to provide additional resolution to flow-through FTMS methods and systems.

For example, in certain aspects, a method of performing mass analysis is provided, the method comprising passing an ion beam comprising a plurality of ions through a quadrupole assembly having a quadrupole rod set extending from an input end for receiving the ions to an output end through which ions exit the quadrupole rod set. A first radial confinement signal is applied to the quadrupole rod set so as to generate a first field for radially confining at least a first portion of the ions as they pass through the quadrupole rod set, and a voltage pulse is applied across the quadrupole assembly so as to excite radial oscillations of the first portion of ions at secular frequencies thereof, wherein fringing fields in proximity to said output end convert said radial oscillations into axial oscillations as said excited ions exit the quadrupole rod set. The axially oscillating ions exiting the quadrupole rod set for the first radial confinement signal generates a first time-varying signal and a Fourier transform is obtained so as to generate a first frequency-domain signal, which is utilized to generate a first mass spectrum of the detected ions. The same process can essentially be applied to the continuous ion beam, but under different radial confinement field conditions so as to generate a second mass spectrum, which is then added to the first mass spectrum. For example, before or after applying the first radial confinement signal, a second radial confinement signal is applied to the quadrupole rod set so as to generate a second field for radially confining at least a second portion of the ions as they pass through the quadrupole rod set, wherein the second radial confinement signal comprises at least one of a different RF voltage and DC voltage to the rods of the quadrupole rod set relative to an RF voltage and a DC voltage of the first radial confinement signal. During the application of the second radial confinement signal, a second voltage pulse is applied across the quadrupole assembly so as to excite radial oscillations of the second portion of ions at secular frequencies thereof, wherein fringing fields in proximity to said output end convert said radial oscillations into axial oscillations as said excited ions exit the quadrupole rod set. The axially oscillating ions exiting the quadrupole rod set for the second radial confinement signal are detected to generate a second time-varying signal, from which a Fourier transform is obtained so as to generate a second frequency-domain signal. The second frequency-domain signals is utilized to generate a second mass spectrum of the detected ions, and the first and second mass spectra are added.

As noted above, in some aspects, the first and second radial confinement signals can differ in at least one of RF voltage and DC voltage applied to the rods of the quadrupole rod set. By way of example, in some embodiments, the first and second radial confinement signals differ in the amplitude of the RF voltages applied to the quadrupole rod set. Additionally, in some related aspects, neither the first nor second radial confinement signal includes a resolving DC voltage applied to the quadrupole rod set. Alternatively, in some aspects, the resolving DC voltage in the first and second radial confinement signals can be identical, but not zero. Additionally or alternatively, in various aspects, the first and second radial confinement signal differ in the resolving DC voltage applied to the quadrupole rod set. For example, in some implementations, only one of the first and second radial confinement signals does not include a resolving DC voltage applied to the quadrupole rod set. In some aspects, the first and second radial confinement signal differ in the resolving DC voltage applied to the quadrupole rod set and the amplitude of the RF voltages in the first and second radial confinement signals are identical.

The voltage pulse applied during the first and second radial confinement signals can have a variety of characteristics (e.g., pulse shape, duration, amplitude) and can have the same or different characteristics from one another. The voltage pulse(s), for example, can be a square voltage pulse, can have a duration in a range of about 10 nanoseconds (ns) to about 1 millisecond (e.g., in a range of about 1 microsecond to about 100 microseconds, or in a range of about 1 microsecond to about 5 microseconds), and/or can have an amplitude in a range of about 5 volts to about 40 volts (e.g., in a range of about 20 volts to 30 volts).

Additionally, the voltage pulse can be applied to the quadrupole assembly in a variety of manners in accordance with the present teachings. By way of example, in some implementations, the voltage pulse is a dipolar voltage pulse applied across two of the rods of the quadrupole rod set. In some aspects, however, the quadrupole assembly further comprises a pair of auxiliary electrodes interposed between the rods of the quadrupole rod set and a dipolar voltage pulse can be applied across the auxiliary electrodes.

In various aspects, the step of passing an ion beam through the quadrupole assembly is performed without trapping the ions therein. Moreover, in some implementations, the ion beam is continuously transmitted through the quadrupole assembly during the application of the first radial confinement signal (and its respective voltage pulse), during the second radial confinement signal (and its respective voltage pulse), and during the time therebetween.

In accordance with various aspects of the present teachings, a mass spectrometer system is provided, comprising an ion source for generating an ion beam comprising a plurality of ions and a quadrupole assembly having a quadrupole rod set extending from an input end for receiving the ions to an output end through which ions exit the quadrupole rod set. One or more power sources are provided that that are configured to provide i) a radial confinement signal to the quadrupole rod set for generating a field for radial confinement of at some of the ions of the ion beam as they pass therethrough, and ii) a voltage pulse across the quadrupole assembly so as to excite radial oscillations of at least a portion of the ions at secular frequencies thereof, wherein fringing fields in proximity to said output end convert said radial oscillations of at least a portion of said excited ions into axial oscillations as said excited ions exit the quadrupole rod set. A detector is provided for detecting at least a portion of said axially oscillating ions exiting the quadrupole rod set so as to generate a time-varying signal. The system further comprises a controller configured to: control the power sources so as to sequentially provide first and second radial confinement signals to the quadrupole rod set, wherein the first and second radial confinement signals differ in at least one of a RF voltage and a resolving DC voltage applied to the rods of the quadrupole rod set; obtain a Fourier transform of said time-varying signal generated from the one or more voltage pulses applied while sequentially applying each of the first and second radial confinement signals so as to generate first and second frequency-domain signals; utilize said first and second frequency-domain signals so as to generate first and second mass spectra of the ions excited from the application of the voltage pulse and each of the first and second radial confinement signals respectively; and join at least portions of the first and second mass spectra.

In certain implementations, the quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis. In various related implementations, the voltage pulse is applied across the rods of one of the first and second pairs of the quadrupole rod set. Further, in some aspects, a pair of auxiliary electrodes extending along the central longitudinal axis on opposed sides thereof are additionally provided, wherein each of the auxiliary electrodes is interposed between a single rod of the first pair of rods and a single rod of the second pair of rods, and wherein the voltage pulse is applied across the auxiliary electrodes.

Further understanding of various aspects of the present teachings can be obtained by reference to the following detailed description in conjunction with the associated drawings, which are described briefly below.

DETAILED DESCRIPTION

Figure 1:
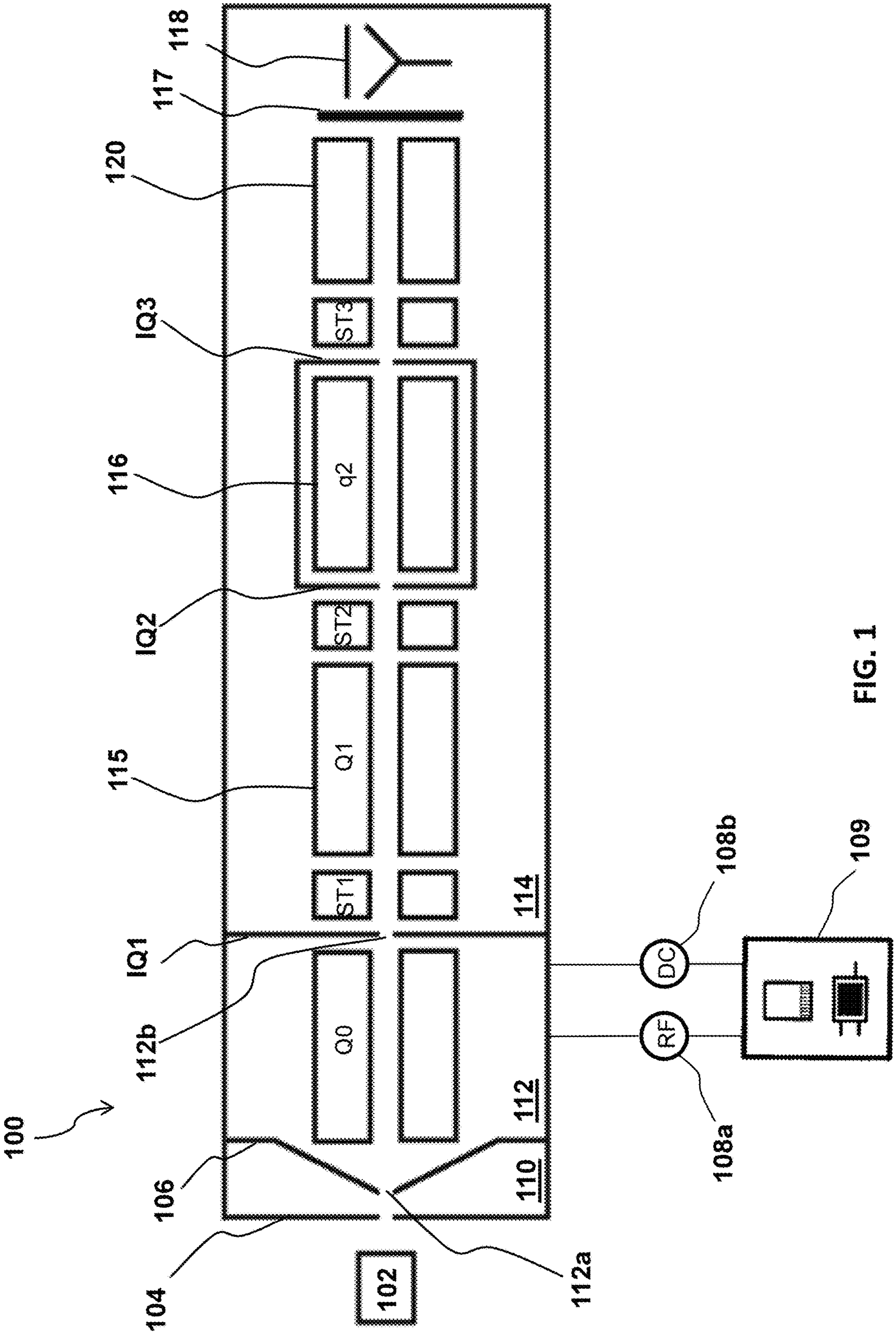
FIG. 1 schematically depicts an exemplary mass spectrometer system in accordance with various aspects of applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner. As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means greater or lesser than the value or range of values stated by 1/10 of the stated values, e.g., ±10%. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Methods and systems for FTMS-based analysis having an improved duty cycle relative to conventional FTMS techniques are provided herein. In accordance with certain aspects of the present teachings, the methods and systems described herein operate on a continuous ion beam, thereby eliminating the relatively long duration trapping and cooling steps associated with Penning traps or orbitraps of conventional FTMS systems. Moreover, the present teachings can be utilized to increase resolving power of flow-through FTMS methods by sequentially interrogating the continuous ion beam under different radially-confining field conditions. In certain methods and systems in accordance with the present teachings, an ion beam comprising a plurality of ions is passed through a quadrupole assembly having a quadrupole rod set while a first radial confinement signal having a fixed RF amplitude is applied to the quadrupole rod set so as to generate a first field for radially confining at least a first portion of the ions as they pass through the quadrupole rod set. A voltage pulse applied across the quadrupole assembly excites radial oscillations of the first portion of ions at their secular frequencies such that fringing fields in proximity to the outlet of the quadrupole rod set convert the radial oscillations into axial oscillations that are detected as the excited ions exit the quadrupole rod set to generate a first time-varying signal. A Fourier transform is obtained therefrom to generate a first frequency-domain signal, which is utilized to generate a first mass spectrum of the detected ions. Thereafter, a different radial confinement field can be generated within the quadrupole rod set and the same process can again be applied to the continuous ion beam to generate a second mass spectrum, either as a matter of course or, for example, based on the desire for additional resolution (e.g., if the spectral peaks are wide), the complexity of the analysis, and/or another data-dependent trigger evident from the first mass spectrum. For example, after the first "slug" of ions excited by the voltage pulse have exited the quadrupole rod set and have been detected, the radially-confining field conditions can be changed to subject the ion beam to a second field of a fixed-RF (differing from the first field in the RF and/or the DC component) and another voltage pulse applied. Axial oscillations resulting from this voltage pulse can then be used to generate a second time-varying signal, a second frequency-domain signal, and ultimately a second mass spectrum, which can be added to the first mass spectrum.

While systems, devices, and methods described herein can be used in conjunction with many different mass spectrometry systems, an exemplary mass spectrometry system 100 for use in accordance with the present teachings is illustrated schematically in FIG. 1. It should be understood that mass spectrometry system 100 represents only one possible configuration and that other mass spectrometry systems modified in accordance with the present teachings can also be used as well. As shown schematically in the exemplary embodiment depicted in FIG. 1, the mass spectrometry system 100 generally includes an ion source 104 for generating ions within an ionization chamber 110, a collision focusing ion guide Q0 housed within a first vacuum chamber 112, and a downstream vacuum chamber 114 containing one or more mass analyzers, one of which is a quadrupole assembly 120 in accordance with the present teachings as discussed below. Though the exemplary second vacuum chamber 114 is depicted as housing three quadrupoles (i.e., elongated rod sets mass filter 115 (also referred to as Q1), collision cell 116 (also referred to as q2), and quadrupole assembly 120), it will be appreciated that more or fewer mass analyzer or ion processing elements can be included in systems in accordance with the present teachings. Though mass filter 115 and collision cell 116 are generally referred to herein as quadrupoles (that is, they have four rods) for convenience, the elongated rod sets 115, 116 may be other suitable multipole configurations. For example, collision cell 116 can comprise a hexapole, octapole, etc. It will also be appreciated that the mass spectrometry system can comprise any of triple quadrupoles, linear ion traps, quadrupole time of flights, Orbitrap or other Fourier transform mass spectrometry systems, all by way of non-limiting examples.

Each of the various stages of the exemplary mass spectrometer system 100 will be discussed in additional detail with reference to FIG. 1. Initially, the ion source 102 is generally configured to generate ions from a sample to be analyzed and can comprise any known or hereafter developed ion source modified in accordance with the present teachings. Non-limiting examples of ion sources suitable for use with the present teachings include atmospheric pressure chemical ionization (APCI) sources, electrospray ionization (ESI) sources, continuous ion source, a pulsed ion source, an inductively coupled plasma (ICP) ion source, a matrix-assisted laser desorption/ionization (MALDI) ion source, a glow discharge ion source, an electron impact ion source, a chemical ionization source, or a photo-ionization ion source, among others.

Ions generated by the ion source 102 are initially drawn through an aperture in a sampling orifice plate 104. As shown, ions pass through an intermediate pressure chamber 110 located between the orifice plate 104 and the skimmer 106 (e.g., evacuated to a pressure approximately in the range of about 1 Torr to about 4 Torr by a mechanical pump (not shown)) and are then transmitted through an inlet orifice 112*a* to enter a collision focusing ion guide Q0 so as to generate a narrow and highly focused ion beam. In various embodiments, the ions can traverse one or more additional vacuum chambers and/or quadrupoles (e.g., a QJet® quadrupole or other RF ion guide) that utilize a combination of gas dynamics and radio frequency fields to enable the efficient transport of ions with larger diameter sampling orifices. The collision focusing ion guide Q0 generally includes a quadrupole rod set comprising four rods surrounding and parallel to the longitudinal axis along which the ions are transmitted. As is known in the art, the application of various RF and/or DC potentials to the components of the ion guide Q0 causes collisional cooling of the ions (e.g., in conjunction with the pressure of vacuum chamber 112), and the ion beam is then transmitted through the exit aperture in IQ1 (e.g., an orifice plate) into the downstream mass analyzers for further processing. The vacuum chamber 112, within which the ion guide Q0 is housed, can be associated with a pump (not shown, e.g., a turbomolecular pump) operable to evacuate the chamber to a pressure suitable to provide such collisional cooling. For example, the vacuum chamber 112 can be evacuated to a pressure approximately in the range of about 1 mTorr to about 30 mTorr, though other pressures can be used for this or for other purposes. For example, in some aspects, the vacuum chamber 112 can be maintained at a pressure such that pressure×length of the quadrupole rods is greater than $2.25\times10^{-2}$ Torr-cm. The lens IQ1 disposed between the vacuum chamber 112 of Q0 and the adjacent chamber 114 isolates the two chambers and includes an aperture 112*b* through which the ion beam is transmitted from Q0 into the downstream chamber 114 for further processing.

Vacuum chamber 114 can be evacuated to a pressure than can be maintained lower than that of ion guide chamber 112, for example, in a range from about $1\times10^{-6}$ Torr to about $1\times10^{-3}$ Torr. For example, the vacuum chamber 114 can be maintained at a pressure in a range of about $8\times10^{-5}$ Torr to about $1\times10^{-4}$ Torr (e.g., $5\times10^{-5}$ Torr to about $5\times10^{-4}$ Torr) due to the pumping provided by a turbomolecular pump and/or through the use of an external gas supply for controlling gas inlets and outlets (not shown), though other pressures can be used for this or for other purposes. The ions enter the quadrupole mass filter 115 via stubby rods ST1. As will be appreciated by a person of skill in the art, the quadrupole mass filter 115 can be operated as a conventional transmission RF/DC quadrupole mass filter that can be operated to select an ion of interest or a range of ions of interest. By way of example, the quadrupole mass filter 115 can be provided with RF/DC voltages suitable for operation in a mass-resolving mode. As should be appreciated, taking the physical and electrical properties of the rods of mass filter 115 into account, parameters for an applied RF and DC voltage can be selected so that the mass filter 115 establishes a transmission window of chosen m/z ratios, such that these ions can traverse the mass filter 115 largely unperturbed. Ions having m/z ratios falling outside the window, however, do not attain stable trajectories within the quadrupole and can be prevented from traversing the mass filter 115. It should be appreciated that this mode of operation is but one possible mode of operation for mass filter 115. By way of example, in some aspects, the mass filter 115 can be operated in a RF-only transmission mode in which a resolving DC voltage is not utilized such that substantially all ions of the ion beam pass through the mass filter 115 largely unperturbed (e.g., ions that are stable at and below Mathieu parameter q=0.908). Alternatively, the lens IQ2 between mass filter 115 and collision cell 116 can be maintained at a much higher offset potential than the rods of mass filter 115 such that the quadrupole mass filter 115 be operated as an ion trap. Moreover, as is known in the art, the potential applied to the entry lens IQ2 can be selectively lowered (e.g., mass selectively scanned) such that ions trapped in mass filter 115 can be accelerated into the collision cell 116, which could also be operated as an ion trap, for example.

Ions transmitted by the mass filter 115 can pass through post-filter stubby rods ST2 (e.g., a set of RF-only stubby rods but that improves transmission of ions exiting a quadrupole) and lens IQ2 into the quadrupole 116, which as shown can be disposed in a pressurized compartment and can be configured to operate as a collision cell at a pressure approximately in the range of from about 1 mTorr to about 30 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, application of suitable RF/DC voltages to the quadrupole 116 and entrance and exit lenses IQ2 and IQ3 can provide optional mass filtering and/or trapping. Similarly, the quadrupole 116 can also be operated in a RF-only transmission mode such that substantially all ions of the ion beam pass through the collision cell 116 largely unperturbed Ions that are transmitted by collision cell 116 pass into the adjacent quadrupole assembly 120, which as shown in FIG. 1 is bounded upstream by IQ3 and stubby rods ST3 and downstream by the exit lens 117. The quadrupole assembly 120 can be operated at a decreased operating pressure relative to that of collision cell 116, for example, at a pressure in a range from about $1\times10^{-6}$ Torr to about $1.5\times10^{-3}$ Torr (e.g., about $5\times10^{-5}$ Torr), though other pressures can be used for this or for other purposes. As discussed in detail below with reference to FIGS. 2A-B, the quadrupole assembly 120 includes a quadrupole rod set such that the application of fixed RF voltages to the quadrupole rods (with or without a resolving DC voltage) can provide radial confinement of the ions as they pass through the quadrupole rod set. Moreover, as the ion beam is transmitted through the quadrupole assembly 120, the application of a DC voltage pulse across the quadrupole assembly 120 can cause radial excitation of at least a portion of the ions (preferably, substantially all) such that the interaction of the radially excited ions with the fringing fields at the exit of the quadrupole rod set can convert the radial excitation into axial excitation and ejection from the quadrupole rod set through the exit lens 117 for detection by detector 118, thereby generating a time-varying ion signal. As discussed in further detail below, the system controller 120, in communication with the detector 118, can operate on the time-varying ion signal (e.g., via one or more processors) to derive a mass spectrum of the detected ions excited by the ion pulse. As will be discussed below, ions passing through the quadrupole may be exposed to only a single excitation pulse. However, once the “slug” of excited ions pass through the quadrupole rod set and the excited ions detected, an additional excitation pulse having the same characteristics and under the same radial-confinement conditions may be triggered so as to improve sensitivity. This can occur every 1 to 2 ms such that about 500 to 1000 data acquisition periods are collected each second.

With the ion beam subject to the first voltage pulse (or multiple voltage pulses under the same radial-confinement field) being continuously transmitted through the quadrupole assembly 120, the radial-confinement field conditions therein can be changed under the influence of the controller 109 by adjusting at least one of the RF and resolving DC signals applied to the rods of the quadrupole rod set. As will be appreciated by a person skilled in the art and as discussed otherwise herein, radial confinement fields are generally produced in a quadrupole rod set through the application of RF signals to the quadrupole rods such that the electrical signals applied to rods on opposed sides of the central axis are identical to one another and are of the same amplitude but 180° out of phase with the RF signal applied to the other pair of rods of the quadrupole rod set. Without a resolving DC voltage (±U=0 V) applied to the quadrupole rods, the quadrupole rod set is said to be operated in a RF-only transmission mode, acting a high-pass filter such that only ions having a q-value less than 0.908 are transmitted therethrough without striking the rods 122*a-b*. In various implementations in accordance with the present teachings, the controller 109 can adjust the radial-confinement field applied during the application of sequential excitation pulses by only adjusting the amplitude of the fixed-RF signal applied to the quadrupole rods (while maintaining the resolving DC voltage equal to zero). It will be appreciated that such a change to the amplitude of the RF signal will adjust the low mass cutoff of the quadrupole rod set and the q-values of the ions of the continuous ion beam. Without being bound by any particular theory, it is believed that some excitation DC pulses may remove high m/z ions (low q-value ions) excited in the low-radial containment field and make them unavailable for detection. Thus, in accordance with the present teachings, if the first mass spectrum indicates an unexpected reduction in the intensity of high m/z ions (or increased spectral peak widths of such ions) following application of the first excitation voltage pulse, the controller 109 can be operable to produce a subsequent mass spectrum from another excitation voltage pulse under stronger radial-confinement conditions (e.g., RF amplitude is increased relative to the first field) to improve the detection of higher m/z ions, thereby resulting in an improved second mass spectrum relative to the first. In some aspects, the second mass spectrum can also be added to the first mass spectrum, which can increase the resolution and/or dynamic range of the first mass spectrum alone in accordance with the present teachings.

In various implementations, the controller 109 can additionally or alternatively adjust the radial-confinement field applied during the application of subsequent excitation pulses by adjusting the amplitude of the resolving DC voltage provided to the quadrupole rods. By way of example, the first radial-confinement field conditions can have the quadrupole rods operating in RF-only transmission mode during the application of the excitation voltage pulse used to generate the first mass spectrum. During the application of a different excitation pulse, however, the quadrupole rod set can be operated as a transmission RF/DC quadrupole (like a quadrupole mass filter) that selectively transmits ions within a chosen m/z range as is known in the art, while ions of the continuous ion beam outside of that window would be generally prevented from traversing the quadrupole rod set. It will likewise be appreciated that different non-zero resolving DC voltages (±U) can be used to generate each of the first and second radial confinement fields provided during the application of the excitation voltage pulse. Finally, in accordance with the present teachings, it will be appreciated that the first and second radial confinement fields can be provided by applying both different RF amplitudes and different, non-zero resolving DC voltages.

As shown in FIG. 1, the exemplary mass spectrometry system 100 additionally includes one or more power sources 108*a,b* that can be controlled by a controller 109 so as to apply electric potentials with RF and/or DC components to the quadrupole rods, various lenses, and auxiliary electrodes so as to configure the elements of the mass spectrometry system 100 for various different modes of operation depending on the particular MS application and in accordance with the present teachings. It will be appreciated that the controller 109 can also be linked to the various elements in order to provide joint control over the executed timing sequences. Accordingly, the controller 109 can be configured to provide control signals to the power source(s) supplying the various components in a coordinated fashion in order to control the mass spectrometry system 100 as otherwise discussed herein. By way of example, the controller 109 may include a processor for processing information, data storage for storing mass spectra data, and instructions to be executed. It will be appreciated that though controller 109 is depicted as a single component, one or more controllers (whether local or remote) may be configured to cause the mass spectrometer system 100 to operate in accordance with any of the methods described herein. Additionally, in some implementations, the controller 109 may be operatively associated with an output device such as a display (e.g., a cathode ray tube (CRT) or liquid crystal display (LCD) for displaying information to a computer user) and/or an input device including alphanumeric and other keys and/or cursor control for communicating information and command selections to the processor. Consistent with certain implementations of the present teachings, the controller 109 executes one or more sequences of one or more instructions contained in data storage, for example, or read into memory from another computer-readable medium, such as a storage device (e.g., a disk). The one or more controller(s) may take a hardware or software form, for example, the controller 109 may take the form of a suitably programmed computer, having a computer program stored therein that is executed to cause the mass spectrometer system 100 to operate as otherwise described herein, though implementations of the present teachings are not limited to any specific combination of hardware circuitry and software. Various software modules associated with the controller 109, for example, may execute programmable instructions to perform the exemplary methods described herein.

Figure 2A:
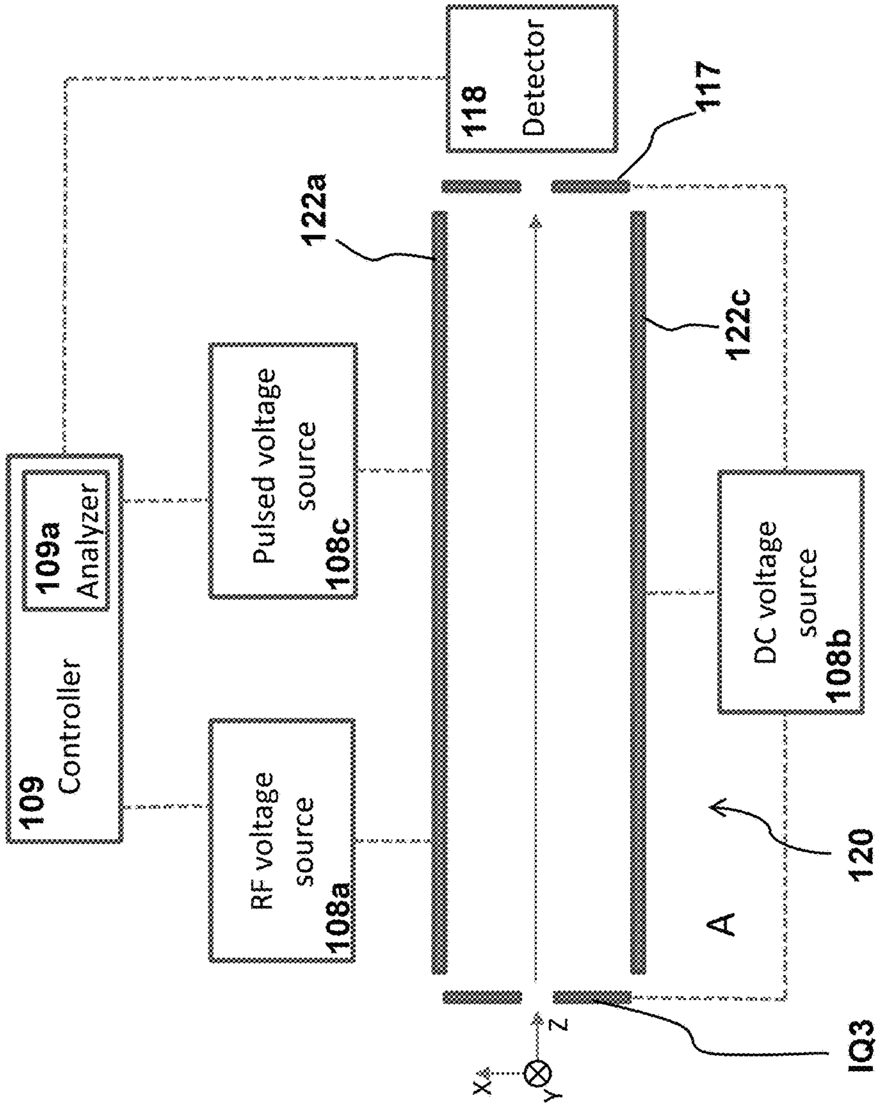
FIG. 2A schematically depicts an exemplary quadrupole assembly suitable for use in the system of FIG. 1 in accordance with various aspects of applicant's teachings.
Figure 2B:
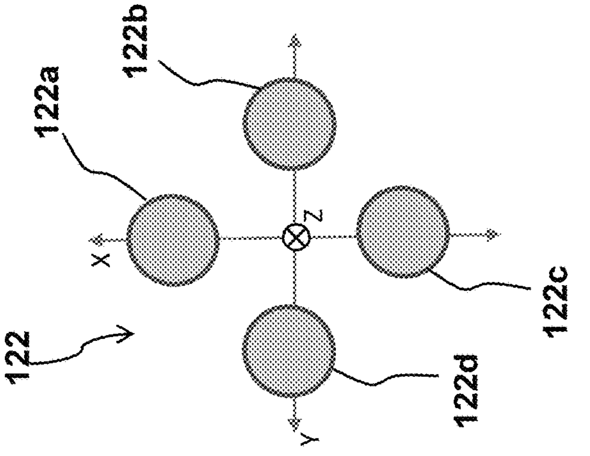
FIG. 2B schematically depicts a cross-section of the quadrupole assembly of FIG. 2A.

With reference now to FIGS. 2A-B, quadrupole assembly 120 comprising a quadrupole rod set 122 in accordance with various aspects of the present teachings is depicted in additional detail. As shown, the quadrupole rod set 122 consists of four parallel rod electrodes 122*a-d* that are disposed around and parallel to a central longitudinal axis (Z) extending from an inlet end (e.g., toward the ion source 102) to an outlet end (e.g., toward detector 118). As best shown in cross-section in FIG. 2B, the rods 122*a-d* have a cylindrical shape (i.e., a circular cross-section) with the innermost surface of each rod 122*a-d* disposed equidistant from the central axis (Z) and with each of the rods 122*a-d* being equivalent in size and shape to one another. In particular, the rods 122*a-d* generally comprise two pairs of rods (e.g., a first pair comprising rods 122*a,c* disposed on the X-axis and a second pair comprising rods 122*b,d* disposed on the Y-axis), with rods of each pair being disposed on opposed sides of the central axis (Z) and to which identical electrical signals can be applied. The minimum distance between each of the rods 122*a-d* and the central axis (Z) is defined by a distance $r_0$ such that the innermost surface of each rod 122*a-d* is separated from the innermost surface of the other rod in its rod pair across the central longitudinal axis (Z) by a minimum distance of $2r_0$. It will be appreciated that though the rods 122*a-d* are depicted as cylindrical, the cross-sectional shape, size, and/or relative spacing of the rods 122*a-d* may be varied as is known in the art. For example, in some aspects, the rods 122*a-d* can exhibit a radially internal hyperbolic surface according to the equation $x^2-y^2=r_0^2$, where $r_0$ (the field radius) is the radius of an inscribed circle between the electrodes in order to generate quadrupole fields.

The rods 122*a-d* are electrically conductive (i.e., they can be made of any conductive material such as a metal or alloy) and can be coupled to one or more power supplies such that one or more electrical signals can be applied to each rod 122*a-d* alone or in combination. As is known in the art, the application of radiofrequency (RF) voltages to the rods 122*a-d* of the quadrupole rod set 122 can be effective to generate a quadrupolar field that radially confines the ions as they pass through the quadrupole rod set 122, with or without a selectable amount of a resolving DC voltage applied concurrently to one or more of the quadrupole rods. Generally as is known in the art, in order to produce a radially-confining quadrupolar field for at least a portion of the ions being transmitted through the quadrupole rod set 122, the power system can apply an electric potential to the first pair of rods 122*a,c* of a rod offset voltage (RO)+[U−V cos Ωt], where U is the magnitude of the resolving DC electrical signal provided by DC voltage source 108*b*, V is the zero-to-peak amplitude of the RF signal provided by RF voltage source 108*a*, Ω is the angular frequency of the RF signal, and t is time. The power system can also apply an electric potential to the second pair of rods 122*b,d* of RO−[U−V cos Ωt] such that the electrical signals applied to the first pair of rods 122*a,c* and the second pair of rods 122*b,d* differ in the polarity of the resolving DC signal (i.e., the sign of U), while the RF portions of the electrical signals would be 180° out of phase with one another. It will be appreciated by a person skilled in the art that the quadrupole rod set 122 can thus be configured as a quadrupole mass filter that selectively transmits ions of a selected m/z range by a suitable choice of the DC/RF ratio. Alternatively, it will be appreciated that the quadrupole rod set 122 can be operated in a RF-only transmission mode in which a DC resolving voltage (U) is not applied such that ions entering the quadrupole rod set 122 that are stable at and below Mathieu parameter q=0.908 would be transmitted through the quadrupole rod set 122 without striking the rods 122*a-b*.

By way of non-limiting example, in some embodiments, the RF voltages applied to the quadrupole rods 122*a-d* can have a frequency in a range of about 0.8 MHz to about 3 MHz and an amplitude in a range of about 100 volts to about 1500 volts, though other frequencies and amplitudes can also be employed. Further, in some embodiments, the DC voltage source 108*b* can apply a resolving DC voltage to one or more of the quadrupole rods 122*a-d* so as to select ions within a desired m/z window. In some embodiments, such a resolving DC voltage can have an amplitude in a range of about 10 to about 150 V, for example.

As noted above, the application of the RF voltage(s) to the various rods 122*a-d* can result in the generation of a radially-confining quadrupolar field within the quadrupole assembly 120, but also characterized by fringing fields in the vicinity of the input and the output ends of the quadrupole rod set 122. By way of example, diminution of the quadrupole potential in the regions in proximity of the output of the quadrupole rod set 122 can result in the generation of fringing fields, which can exhibit a component along the longitudinal direction of the quadrupole (along the z-direction). In some embodiments, the amplitude of this electric field can increase as a function of increasing radial distance from the center of the quadrupole rod set 122. As discussed in more detail below, such fringing fields can be utilized in accordance with the present teachings to couple the radial and axial motions of ions within the quadrupole assembly 120.

By way of illustration and without being limited to any particular theory, the application of RF voltage(s) to the quadrupole rods 122*a-d* can result in the generation of a two-dimensional quadrupole potential as defined in the following relation:

$$\varphi_{2D} = \varphi_0 \frac{x^2 - y^2}{r_0^2} \quad \text{Eq. (1)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole rod set 122 may be characterized by the diminution of the two-dimensional quadrupole potential in the vicinity of the input and the output ends by a function $f(z)$ as indicated below:

$$\varphi_{FF} = \varphi_{2D} f(z) \quad \text{Eq. (2)}$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to diminution of the two-dimensional quadrupole field can be described as follows:

$$E_{z,quad} = -\varphi_{2D} \frac{\partial f(z)}{\partial z} \quad \text{Eq. (3)}$$

Figure 5B:
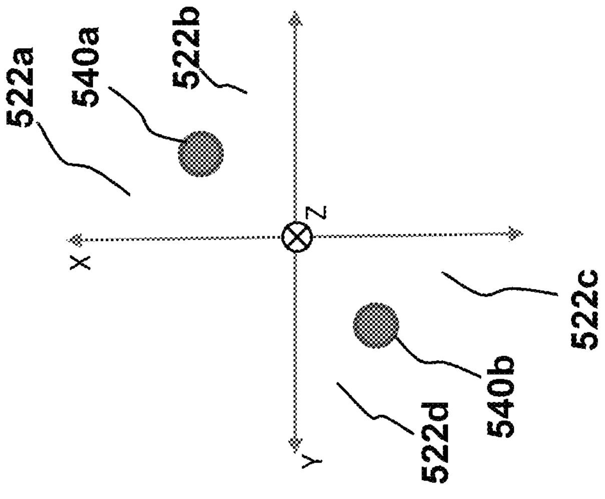
FIG. 5B schematically depicts a cross-section of the quadrupole assembly of FIG. 5A.
Figure 5A:
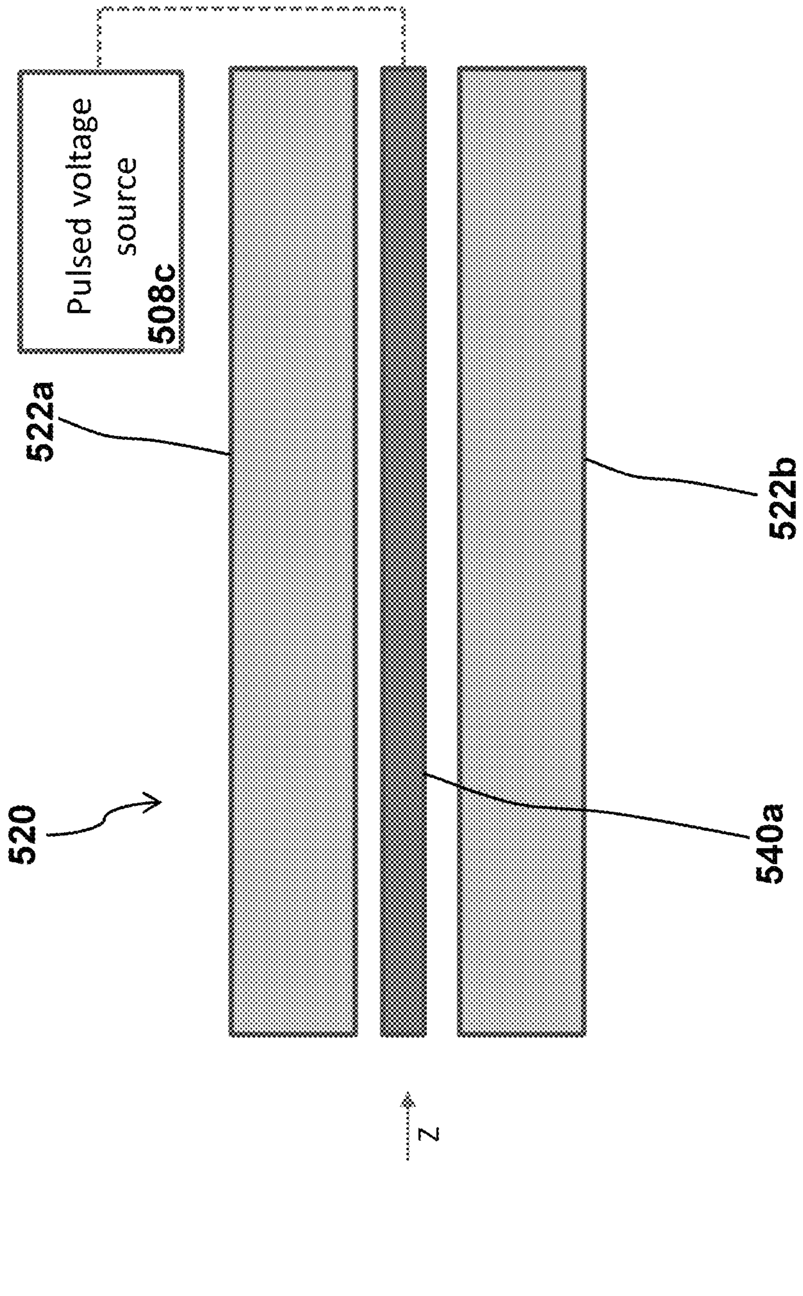
FIG. 5A schematically depicts another exemplary quadrupole assembly suitable for use in the system of FIG. 1 in accordance with various aspects of applicant's teachings.

As discussed in more detail below, such a fringing field allows the conversion of radial oscillations of ions that are excited via application of a voltage pulse to one or more of the quadrupole rods 122*a-d* (and/or one or more auxiliary electrodes as discussed below with reference to FIGS. 5A-B) to axial oscillations such that the axially oscillating ions can be detected by the detector 118.

With specific reference to FIGS. 1 and 2A, in this exemplary embodiment, the system 100 includes an input lens IQ3 disposed in proximity of the input end of the quadrupole rod set 122 (ST is omitted in FIG. 2A for clarity) and an output lens 117 disposed in proximity of the output end of the quadrupole rod set 122. A DC voltage source 108*b*, operating under the control of the controller 109, can apply two DC voltages to the input lens IQ3 and the output lens 117 (e.g., in range of about 1 to 50 V attractive relative to the DC offset applied to the quadrupole rods 122*a-d*). In some embodiments, the DC voltage applied to the input lens IQ3 causes the generation of an electric field that facilitates the entry of the ions into the quadrupole rod set 122. Further, the application of a DC voltage to the output lens 117 can facilitate the exit of the ions from the quadrupole rod set 122.

It will be appreciated that the lenses IQ3 and 117 can be implemented in a variety of different ways. For example, in some embodiments, the lenses can be in the form of a plate having an opening through which the ions pass. In other embodiments, at least one (or both) of the lenses can be implemented as a mesh. As noted above, there can also be RF-only Brubaker lenses ST at the entrance and exit ends of the quadrupole rod set 122.

With continued reference to FIG. 2A, the quadrupole assembly 120 can be coupled to a pulsed voltage source 108*c* for applying a voltage pulse to at least one of the quadrupole rods 122*a-d*. For example, the pulsed voltage source 108*c* can apply a dipolar pulsed voltage to the first pair of rods 122*a,c*, though in other embodiments, the dipolar pulsed voltage can instead be applied to the second pair of rods 122*b,d*. In general, a variety of pulse amplitudes and durations can be employed. In many embodiments, the longer the pulse width, the smaller the pulse amplitude that is utilized to generate the radial oscillations in accordance with the present teachings. In various embodiments, the amplitude of the applied voltage pulse can be, for example, in a range of about 5 volts to about 40 volts, or in a range of about 20 volts to about 30 volts, though other amplitudes can also be used. Further, the duration of the voltage pulse (pulse width) can be, for example, in a range of about 10 nanoseconds (ns) to about 1 millisecond, e.g., in a range of about 1 microsecond to about 100 microseconds, or in a range of about 1 microsecond to about 5 microseconds, though other pulse durations can also be used. Ions passing through the quadrupole are normally exposed to only a single excitation pulse. Once the "slug" of excited ions pass through the quadrupole rod set 122 as discussed below, an additional excitation pulse may be triggered. This can occur every 1 to 2 ms such that about 500 to 1000 data acquisition periods are collected each second.

Figure 2C:
FIG. 2C schematically depicts a square voltage pulse suitable for use in some embodiments of a quadrupole assembly according to the present teachings.

The waveform associated with the voltage pulse can have a variety of different shapes with the goal of providing a rapid broadband excitation signal in accordance with the present teachings. By way of example, FIG. 2C schematically shows an exemplary voltage pulse having a square temporal shape. In some embodiments, the rise time of the voltage pulse, i.e., the time duration that it takes for the voltage pulse to increase from zero voltage to reach its maximum value, can be, for example, in a range of about 1 to 100 nsec. In other embodiments, the voltage pulse can have a different temporal shape.

Without being limited to any particular theory, the application of the voltage pulse (e.g., across two opposed quadrupole rods 122*a,c*) generates a transient electric field within the quadrupole assembly 120. The exposure of the ions within the quadrupole rod set 122 to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole rod set 122. As the radially excited ions reach the end portion of the quadrupole rod set 122 in the vicinity of the output end, they will interact with the exit fringing fields such that the radial oscillations of at least a portion of the excited ions can convert into axial oscillations, again without being limited to any particular theory.

Referring again to FIGS. 1 and 2A, axially-oscillating ions can thus exit the quadrupole rod set 122 via the exit lens 117 to reach the detector 118 such that the detector 118 generates a time-varying ion signal in response to the detection of the axially-oscillating ions. It will be appreciated that a variety of detectors known in the art and modified in accordance with the present teachings can be employed. Some examples of suitable detectors include, without limitation, Photonis Channeltron Model 4822C and ETP electron multiplier Model AF610.

As shown in FIG. 2A, an analysis module or analyzer 109*a* associated with the controller 109 can receive the detected time-varying signal from the detector 118 and operate on that signal to generate a mass spectrum associated with the detected ions. More specifically, in this embodiment, the analyzer 109*a* can obtain a Fourier transform of the detected time-varying signal to generate a frequency-domain signal. The analyzer can then convert the frequency domain signal into a mass spectrum using the relationships between the Mathieu parameters a and a and the ion's m/z.

$$a_x = -a_y = \frac{8zU}{\Omega^2 r_0^2 m} \qquad \text{Eq. (4)}$$

$$q_x = -q_y = \frac{4zV}{\Omega^2 r_0^2 m} \qquad \text{Eq. (5)}$$

where z is the charge on the ion, U is the resolving DC voltage on the rods, V is the RF voltage amplitude, Ω is the angular frequency of the RF, and $r_0$ is the characteristic dimension of the quadrupole. The radial coordinate r is given by the equation:

$$r^2 = x^2 + y^2 \qquad \text{Eq. (6)}$$

In addition, when parameter q<~0.4, the parameter β is given by the equation:

$$\beta^2 = a + \frac{q^2}{2} \qquad \text{Eq. (7)}$$

and the fundamental secular frequency is determined as follows:

$$\omega = \frac{\beta\Omega}{2} \qquad \text{Eq. (8)}$$

Under the condition where parameter a=0 and parameter q<~0.4, the secular frequency is related to the particular ion's m/z by the approximate relationship below:

$$\frac{m}{z} \sim \frac{2}{\sqrt{2}} \frac{V}{\omega \Omega r_0^2} \qquad \text{Eq. (9)}$$

The exact value of β is a continuing fraction expression in terms of the a and q Mathieu parameters. This continuing fraction expression can be found in the reference J. Mass Spectrom. Vol 32, 351-369 (1997), which is herein incorporated by reference in its entirety.

The relationship between m/z and secular frequency can alternatively be determined through fitting a set of frequencies to the equation:

$$\frac{m}{z} = \frac{A}{\omega} + B \qquad \text{Eq. (10)}$$

where, A and B are constants to be determined.

With the time-varying signal generated by the detector 118 transformed, the generated frequency-domain signal thus contains information regarding the m/z distribution of ions within the ion beam that were excited at their secular frequency as a result of the application of the voltage pulse as discussed above. Such information can be presented in a plot, for example, known as a "mass spectra" that depicts the signal intensity at each m/z (indicative of the number of ions of that particular m/z that were sufficiently excited so as to enable detection), the integration of which indicates the ion beam intensity or total ion current (indicative of the total number of ions of various m/z that were sufficiently excited so as to enable detection).

After or before generating this first mass spectra under the first radial confinement conditions (e.g., but after the one or more excitation pulses applied to the quadrupole assembly 120 used to generate the first mass spectra have been applied), the controller 109 can be operable to adjust the signals applied by the power sources 108*a,b* so as to generate different radial confinement conditions within the quadrupole rod set 122. The controller 109 can adjust the radial confinement field, for example, automatically or under the direction of a user. By way of example, the controller 109 can operate to change the radial confinement conditions to automatically generate a second mass spectrum. Alternatively, the controller 109 can operate to change the radial confinement conditions if it is determined that the first mass spectrum does not provide sufficient resolution (e.g., if the spectral peaks are wide for higher m/z ions), the sample is complex (e.g., the first radial confinement conditions provide RF/DC mass filtering of a first range of m/z and the second radial confinement conditions provide RF/DC mass filtering of a second range of m/z), and/or another data-dependent trigger evident from the first mass spectrum. Alternatively, for example, the first mass spectrum can be displayed to a user and the user can choose (e.g., based on the quality of the spectrum) whether additional or alternative radial confinement conditions should be applied.

As discussed above, the second radial confinement signal can comprise a different RF voltage (i.e., $V_{0-P}$), a different resolving DC voltage (i.e., U), or both a different RF voltage and a different resolving DC voltage to the rods of the quadrupole rod set 122 relative to those of the first radial confinement signal such that as continuous ion beam is transmitted through the quadrupole rod set 122 a different portion of ions may be excited by the dipolar excitation voltages applied to the quadrupole assembly. As with the first radial confinement signal, the quadrupole assembly 120 can be operated to generate a second time-varying signal of the ions of the continuous ion beam excited by the excitation pulse(s), from which a frequency-varying signal can be obtained (e.g., via Fourier transform), and a second mass spectrum can be generated. In further aspects, the controller 109 can also be operative to generate more than two mass spectra under different field conditions, for example, a third mass spectrum under third radial confinement field conditions, a fourth mass spectrum under fourth radial confinement field conditions, a fifth mass spectrum under fifth radial confinement field conditions, etc.

Figure 3A:
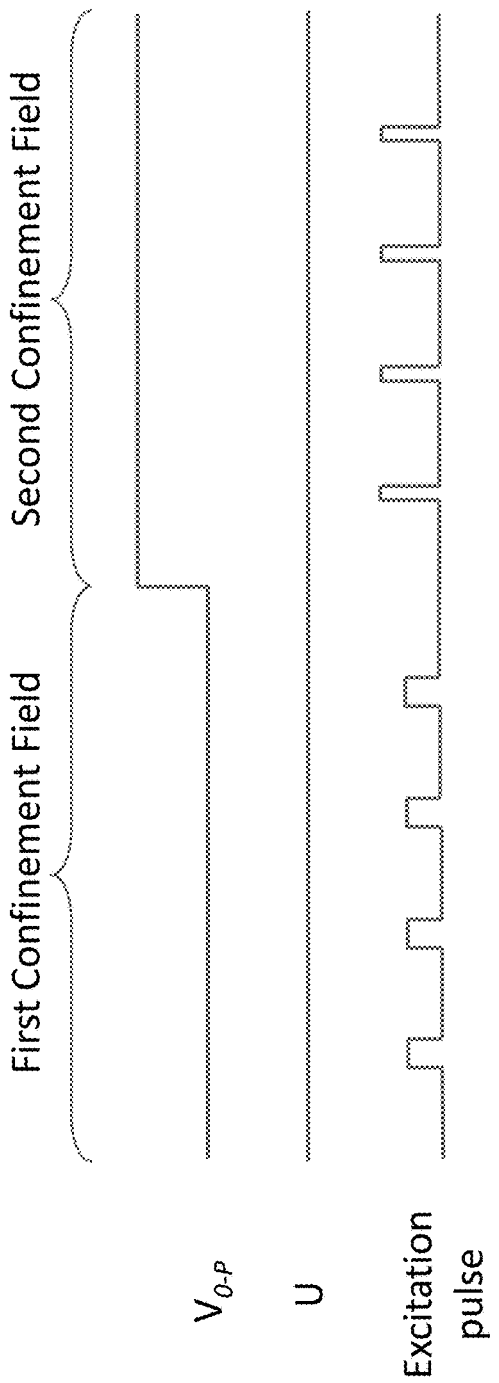
FIG. 3A schematically depicts exemplary signals for generating first and second radial confinement fields and excitation pulses in accordance with various aspects of applicant's teachings.
Figure 3B:
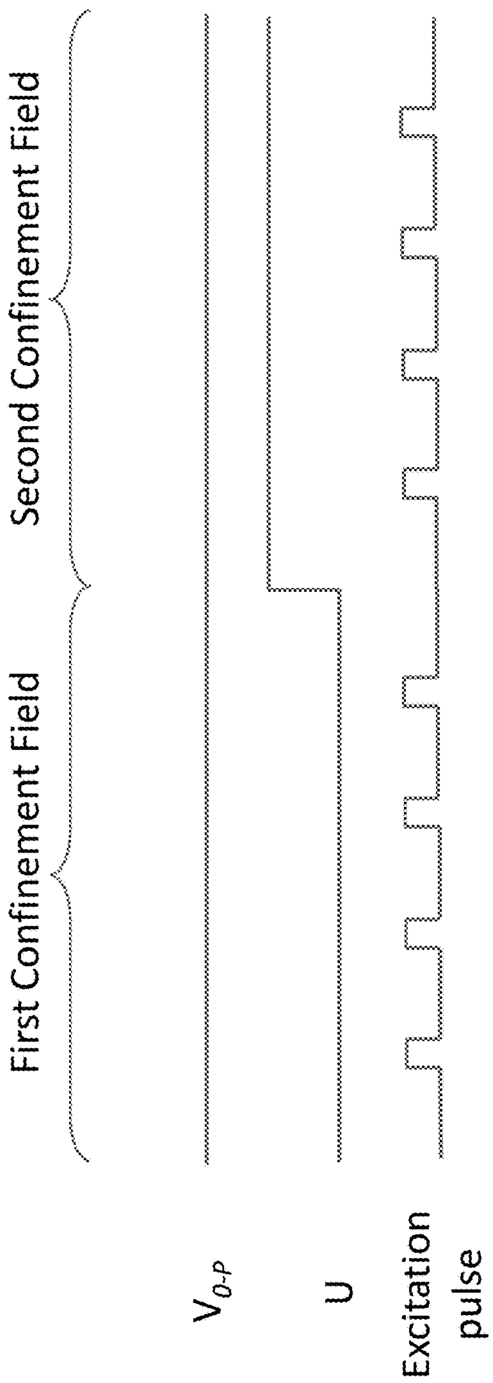
FIG. 3B schematically depicts another set of exemplary signals for generating first and second radial confinement fields and excitation pulses in accordance with various aspects of applicant's teachings.
Figure 3C:
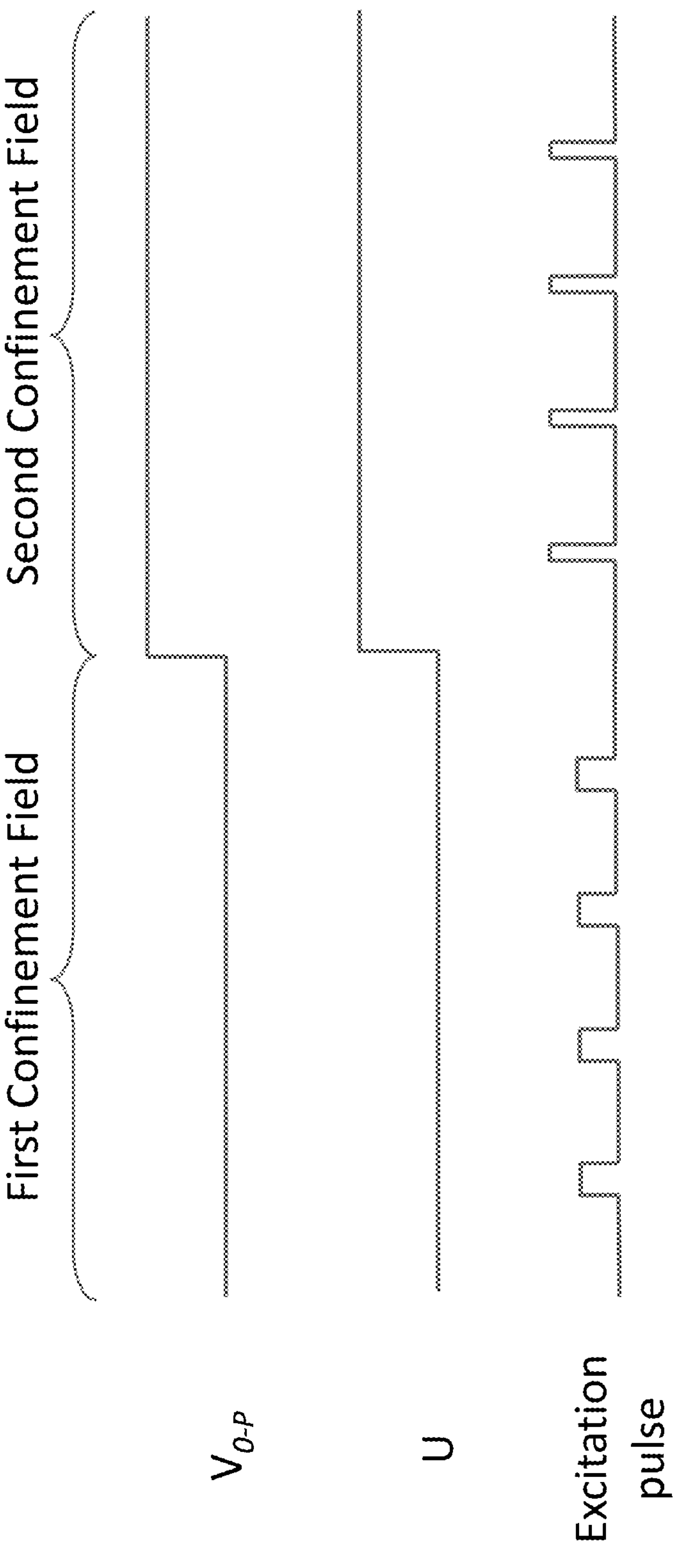
FIG. 3C schematically depicts another set of exemplary signals for generating first and second radial confinement fields and excitation pulses in accordance with various aspects of applicant's teachings.

With reference now to FIGS. 3A-C, exemplary sequences of the generation of first and second radial confinement fields will be discussed. As shown in FIG. 3A, for example, the first and second radial confinement fields differ in the amplitude of the RF signal ($V_{0-P}$) applied to the quadrupole rods 122*a-d* of the quadrupole rod set. The resolving DC voltage (U), however, is maintained at a fixed value during the generation of the first and second radial confinement fields. As discussed above, this resolving DC voltage can be zero such that the quadrupole rod set acts as a high-pass filter (i.e., ions having a q-value less than 0.908 are transmitted therethrough) or can be maintained at a non-zero fixed value such that the quadrupole rod set such that ions within a selected range of m/z are transmitted therethrough (ions outside of the bandpass window tend to become unstable and strike the rods 122*a-d*). As shown in FIG. 3A, during the generation of the first radial confinement field, four dipolar excitation square pulses can be applied, with the detector detecting the ions of the continuous ions excited after each dipolar voltage pulse. From these detected time varying signals resulting from the first four dipolar pulses, a first mass spectrum can be generated. A second mass spectrum can be generated from those ions of the continuous ion beam excited by the four dipolar applied during the second radial confinement field, which as shown in FIG. 3A exhibits a higher RF amplitude relative to that applied during the first radial confinement field. Additionally, it should be noted that the voltage pulses applied during the first and second radial confinement fields need not be identical. For example, as shown in FIG. 3A, the dipolar voltages applied during the second radial confinement field have a higher amplitude and shorter duration than those applied during the first radial confinement field. As discussed otherwise herein, the first or second mass spectrum can be utilized individually or can be added to provide, for example, increased resolution and/or dynamic range.

With reference now to FIG. 3B, the exemplary first and second radial confinement fields are shown to differ in the amplitude of the resolving DC voltage applied to the quadrupole rods 122*a-d*. For example, the resolving DC voltage can initially be zero (the quadrupole rod set is operating in RF-only transmission mode), and can then be increased to a second non-zero voltage (the quadrupole rod set is operating in RF/DC mass filter mode). Alternatively, the resolving DC voltages can both be non-zero but different under first and second radial confinement field conditions. In accordance with certain aspects of the present teachings, the second radial confinement field can be adjusted such that the secular frequency of the excited ions increased, which can increase the frequency resolution ($f/\Delta f$) of the frequency domain signal, and thus the mass spectral resolution.

It will be noted that each voltage pulse applied during the first and second radial confinement conditions are substantially identical, although as noted above the dipolar excitation pulses can differ. In any event, the various depicted field conditions and excitation pulses are applied to the ion beam that can be continuously transmitted through the quadrupole rod set 122 during the first and second radial confinement fields, and in some aspects, in the duration therebetween.

With reference now to FIG. 3C, exemplary signals associated with another implementation is depicted in which both the RF ($V_{0-P}$) and DC (U) amplitudes differ between the first and second radial confinement fields. Additionally, as shown, the characteristics (e.g., amplitude, duration) of the dipolar excitation pulses can also differ under the varying field conditions, for example. In any event, the various depicted radial confinement field conditions and excitation pulses are applied to the ion beam that can be continuously transmitted through the quadrupole rod set 122 during the first and second radial confinement fields, and in some aspects, in the duration therebetween.

In some embodiments, a quadrupole assembly according to the present teachings can be employed to generate mass spectra with a resolution that depends on the length of the time-varying excited ion signal, but the resolution can be typically in a range of about 100 to about 1000. In some aspects, the second radial confinement field can be effective to increase the secular frequency of the ions, which can increase the frequency resolution (f/Δf) of the frequency domain signal, and thus the mass spectral resolution.

Figure 4:
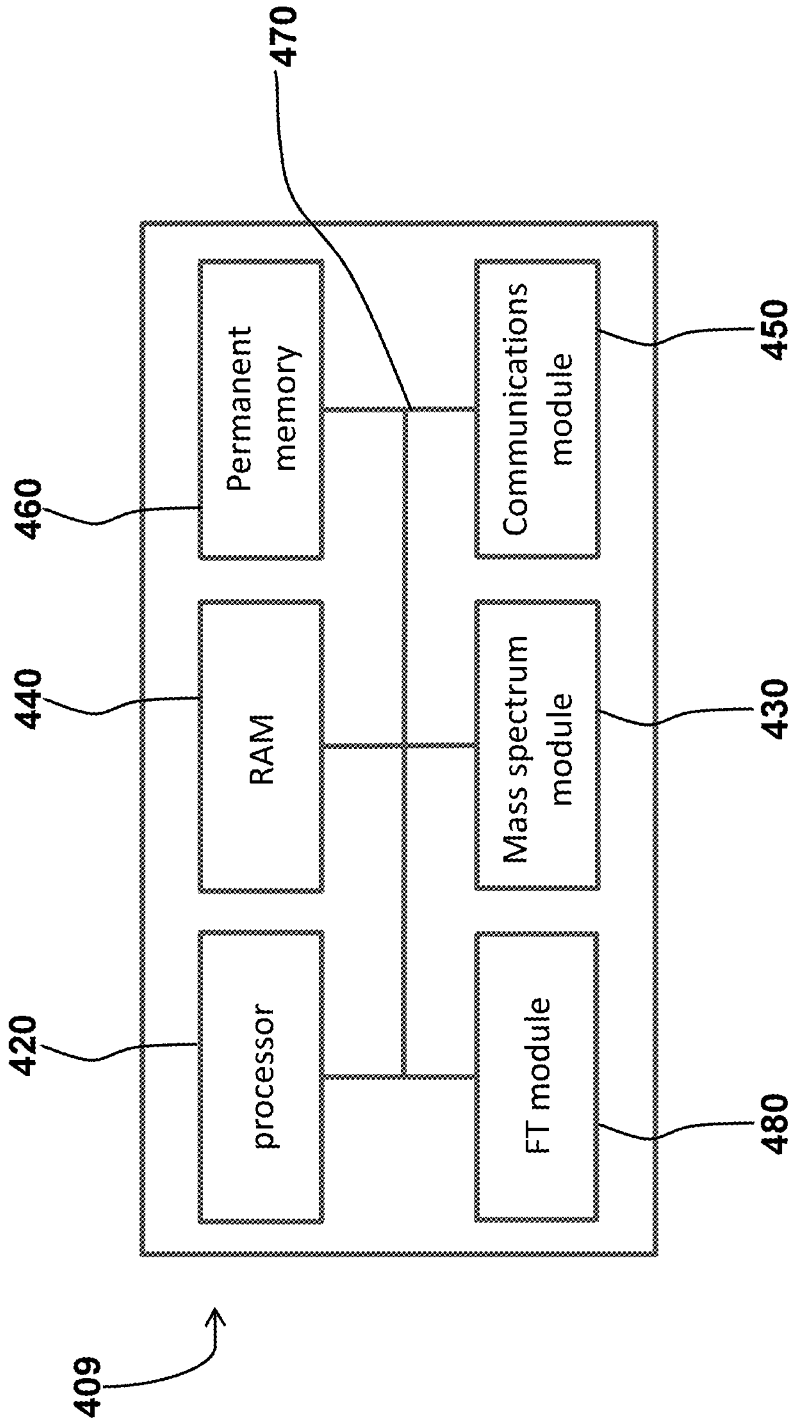
FIG. 4 schematically depicts an exemplary implementation of a controller suitable for use with a quadrupole assembly in accordance with various aspects of applicant's teachings.

The controller 109 can be implemented in hardware and/or software in a variety of different ways. By way of example, FIG. 4 schematically depicts an embodiment of a controller 409, which includes a processor 420 for controlling the operation of its various modules utilized to perform analysis in accordance with the present teachings. As shown, the controller 409 includes a random-access memory (RAM) 440 and a permanent memory 460 for storing instructions and data. The controller 409 also includes a Fourier transform (FT) module 480 for transforming the time-varying ion signal received from the detector 118 (e.g., via Fourier transform) into a frequency domain signal, and a mass spectrum module 430 for calculating the mass spectrum of the detected ions based on the frequency domain signal, and in some implementations, join at least portions of the mass spectra generated under the various radial confinement field conditions together to generate a mass spectrum having improved resolution and/or dynamic range. By way of example, portions of a first mass spectra for low m/z ions generated under first radial confinement conditions can be utilized with portions of a second mass spectra exhibiting higher resolution for relatively high m/z ions under second radial confinement conditions. A communications module 450 allows the controller 409 to communicate with the detector 118, e.g., to receive the detected ion signal, and the power supplies so as to adjust the radial confinement field conditions and/or voltage pulses. A communications bus 470 allows various components of the controller 409 to communicate with one another.

In some embodiments, a quadrupole assembly according to the present teachings can additionally include one or more auxiliary electrodes to which the voltage pulse can be applied for radial excitation of the ions within the quadrupole. By way of example, FIGS. 5A and 5B schematically depict another exemplary quadrupole assembly 520, which includes a quadrupole rod set 522 comprising four rods 522*a-d* (only two if which are seen in FIG. 5A). The rods 522*a-d* function similarly as the quadrupole rod set 122 discussed above with reference to FIG. 2 (e.g., they generate a radially-confining field via RF signals applied thereto (power supply not shown)), but differ in that a plurality of auxiliary electrodes 540*a,b* are instead electrically coupled to the pulsed voltage source 508*c* for generating the broadband radial excitation of the ions within the quadrupole rod set 522. As shown, the auxiliary electrodes 540*a,b* also extend along the central axis (Z) and are interspersed between the quadrupole rods such that the auxiliary electrodes 540*a,b* are disposed on opposed sides of the central axis (Z) from one another. In this embodiment, the auxiliary electrodes 540*a,b* have similar lengths as the quadrupole rods 522*a-d*, though in other embodiments they can have different lengths (e.g., shorter). It will also be appreciated that though auxiliary electrodes 540*a,b* are depicted as rods having a circular cross-section that is smaller than the rods 522*a-d*, the electrodes 540*a,b* can have a variety of shapes and sizes. By way of example, in this embodiment, a pulsed voltage source 508*c* can apply a dipolar voltage pulse to the electrodes 540*a,b* (e.g., a positive voltage to the electrode 540*a* and a negative voltage to the electrode 540*b*). Similar to the quadrupole assembly 120 discussed above with reference to FIGS. 2A-B, the voltage pulse can cause radial excitation of at least some of the ions passing through the quadrupole such that the interaction of the radially-excited ions with the fringing fields in proximity of the output end of the quadrupole can convert the radial oscillations to axial oscillations, which can be detected by a detector (not shown). Likewise, a controller and various analysis modules such as those discussed above can operate on the time-varying ion signal generated as a result of the detection of the axially oscillating ions to generate a frequency domain signal and mass spectrum.

The following examples are provided for further elucidation of various aspects of the present teachings, and are not intended to necessarily provide the optimal ways of practicing the present teachings or the optimal results that can be obtained.

Example 1

Figure 6A:
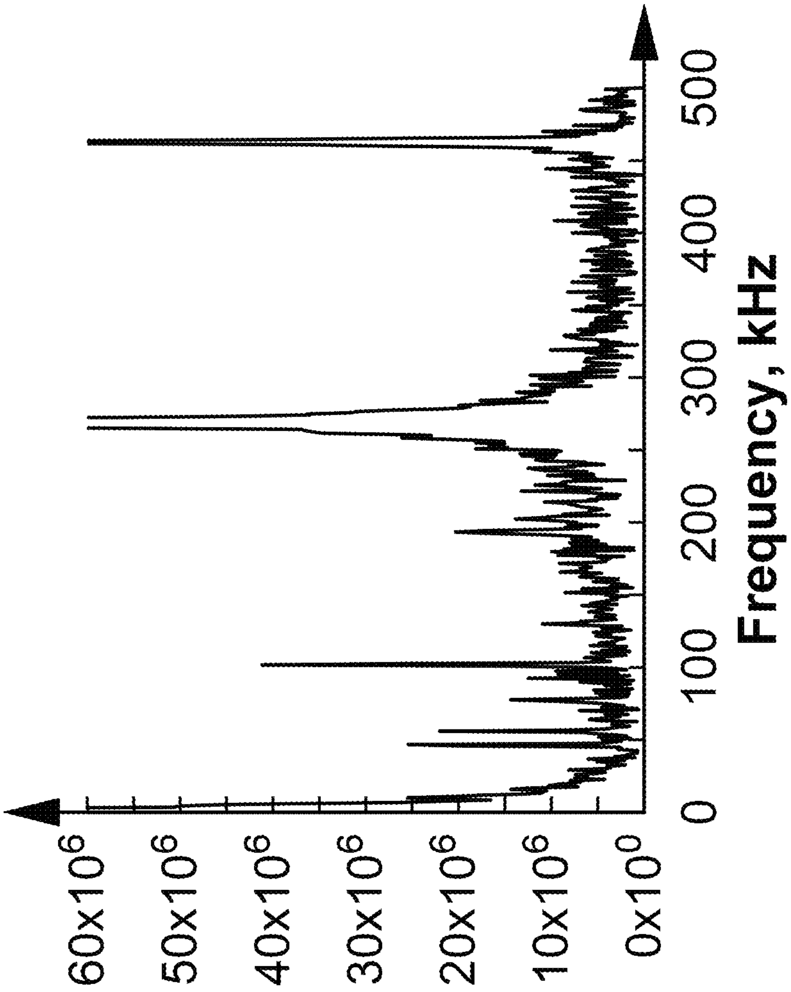
FIG. 6A depicts a Fourier transform of a time-varying ion signal obtained using a prototype quadrupole assembly in accordance with various aspects of applicant's teachings.
Figure 6B:
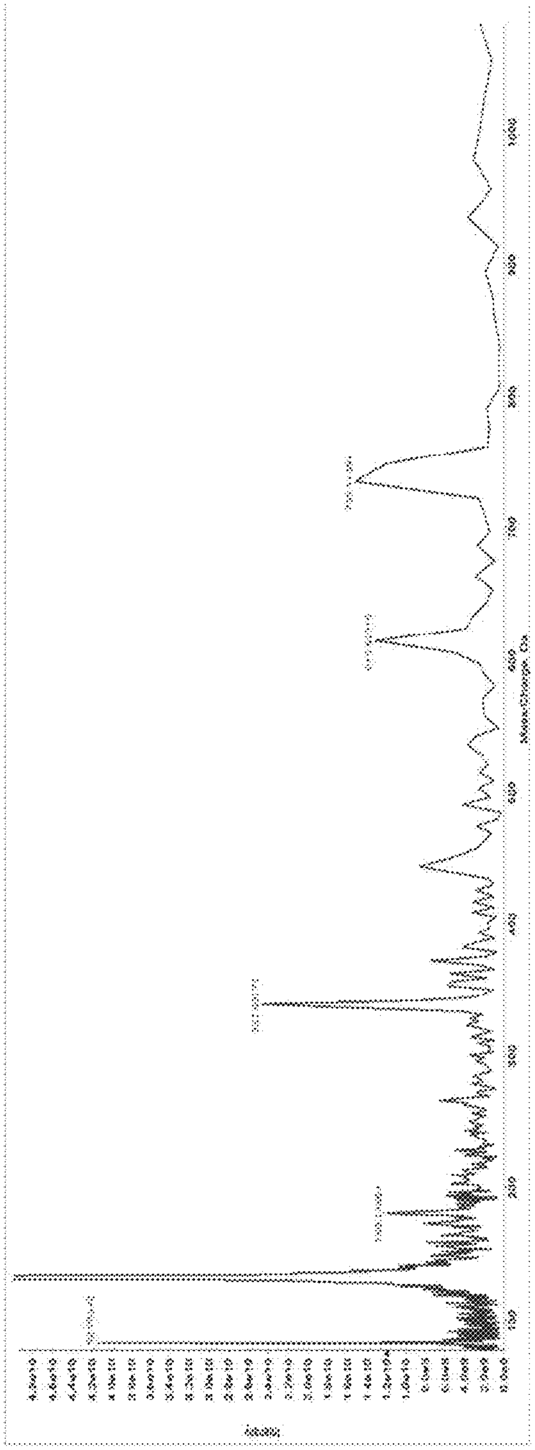
FIG. 6B depicts the mass spectrum of the frequency-domain signal of FIG. 6A.

A 4000 QTRAP® (Sciex) mass spectrometer was modified to incorporate a quadrupole assembly according to the present teachings by coupling opposed quadrupole rods of Q3 (in the position of quadrupole assembly 120 of FIG. 1) to a pulsed voltage source capable of providing a dipolar excitation signal to the opposed quadrupole rods. Ions were generated from the ESI Positive Calibration Solution for the SCIEX X500 System (SCIEX part number: 5042912) by a nebulizer-assisted electrospray ion source (not shown) and are transmitted through a collision focusing ion guide (e.g., Q0 operating at a pressure of about $8\times10^{-3}$ Torr), mass filter Q1 (operating in RF/DC mass filter mode to select ions within the window from m/z 77-1081), collision cell q2 (operating in RF-only transmission mode) and the modified Q3 (operating at $1\times10^{-3}$ Torr). The drive RF frequency for the quadrupole rod set of modified Q3 was 1.8284 MHz and the modified Q3 RF voltage was fixed at 315 $V_{0\text{-}peak}$. Excitation of ions as they pass through the quadrupole assembly was provided by amplification of a square pulse generated by an Agilent 33220A function generator applied in a dipolar manner to two opposed rods of the quadrupole. Dipolar pulses were applied at 30 V after amplification and for a duration of 750 ns. Since this modified Q3 quadrupole assembly operates on a continuous ion beam, once the oscillatory signal from each pulse has died away, another excitation pulse can be triggered and another oscillatory signal acquired. The oscillatory signal from each excitation pulse lasts for approximately 1 ms, and 1024 such traces were acquired. The data was acquired at a rate of about 500 spectra/sec. When this data file was put through a FFT program (DPlot Version 2.2.1.1, HydeSoft Computing, USA), the frequency spectrum shown in FIG. 6A is generated. A Fourier transform of the frequency spectrum of FIG. 6A results in the mass spectrum of FIG. 6B, which depicts the mass-dependent resolution changes. In particular, the relatively higher m/z ions exhibit broader peak widths and decreased intensity. As noted above, it is believed that some excitation DC pulses remove these relatively high m/z ions (low q-value ions) that are excited in the low-radial containment field and make them unavailable for detection, without being bound by any particular theory.

Figure 6C:
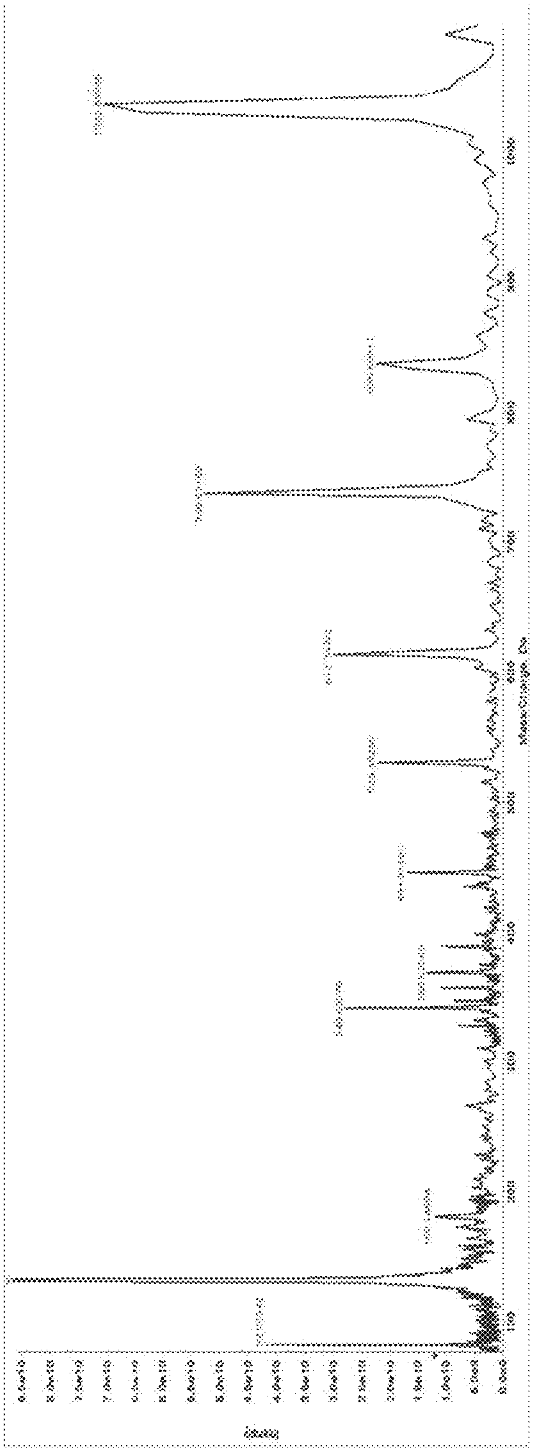
FIG. 6C depicts a mass spectrum obtained using the prototype of FIG. 6A and formed by joining the mass spectrum of FIG. 6B with one obtained under different radial confinement conditions in accordance with various aspects of the applicant's teachings.

In accordance with certain aspects of the present teachings, another mass spectra was obtained in which the radial confinement field was strengthened by increasing the modified Q3 RF voltage to 1260 $V_{0\text{-}peak}$. Excitation pulses were again applied to the continuous ion beam and a second mass spectrum was obtained from 1024 time-varying traces (data was acquired at a rate of about 250 spectra/sec), which was then added to the mass spectrum of FIG. 6B to result in FIG. 6C. It will be appreciated that the spectrum of FIG. 6C exhibits additional peaks for ions having m/z greater than the m/z 736 of FIG. 6B, thereby demonstrating increased dynamic range. Moreover, when the spectra are combined as in FIG. 6C, the peaks at the m/z greater than about m/z 300 exhibit increased intensity and resolution. For example, at m/z 736, the full width half max (FWHM) is 27 amu in FIG. 6B and only 5.5 in FIG. 6C.

Example 2

The modified 4000 QTRAP® described above with reference to Example 1 was also used in the following example in which ions were generated from a sample containing 0.17 pmol/μL reserpine solution by a nebulizer-assisted electrospray ion source (not shown) and are transmitted through a collision focusing ion guide (e.g., Q0 operating at a pressure of about $8\times10^{-3}$ Torr), mass filter Q1 (operating in RF/DC mass filter mode to select m/z 609 reserpine ions), collision cell q2 (operating in RF-only transmission mode) and the modified Q3 (operating at $3.5\times10^{-4}$ Torr). The drive RF frequency for the quadrupole rod set of modified Q3 was 1.8394 MHz and the modified Q3 RF voltage was fixed at 637 $V_{0\text{-}peak}$. Excitation of ions as they pass through the quadrupole assembly was provided by amplification of a square pulse generated by an Agilent 33220A function generator applied in a dipolar manner to two opposed rods of the quadrupole. Dipolar pulses were applied at 30 V after amplification and for a duration of 750 ns.

Figure 7:
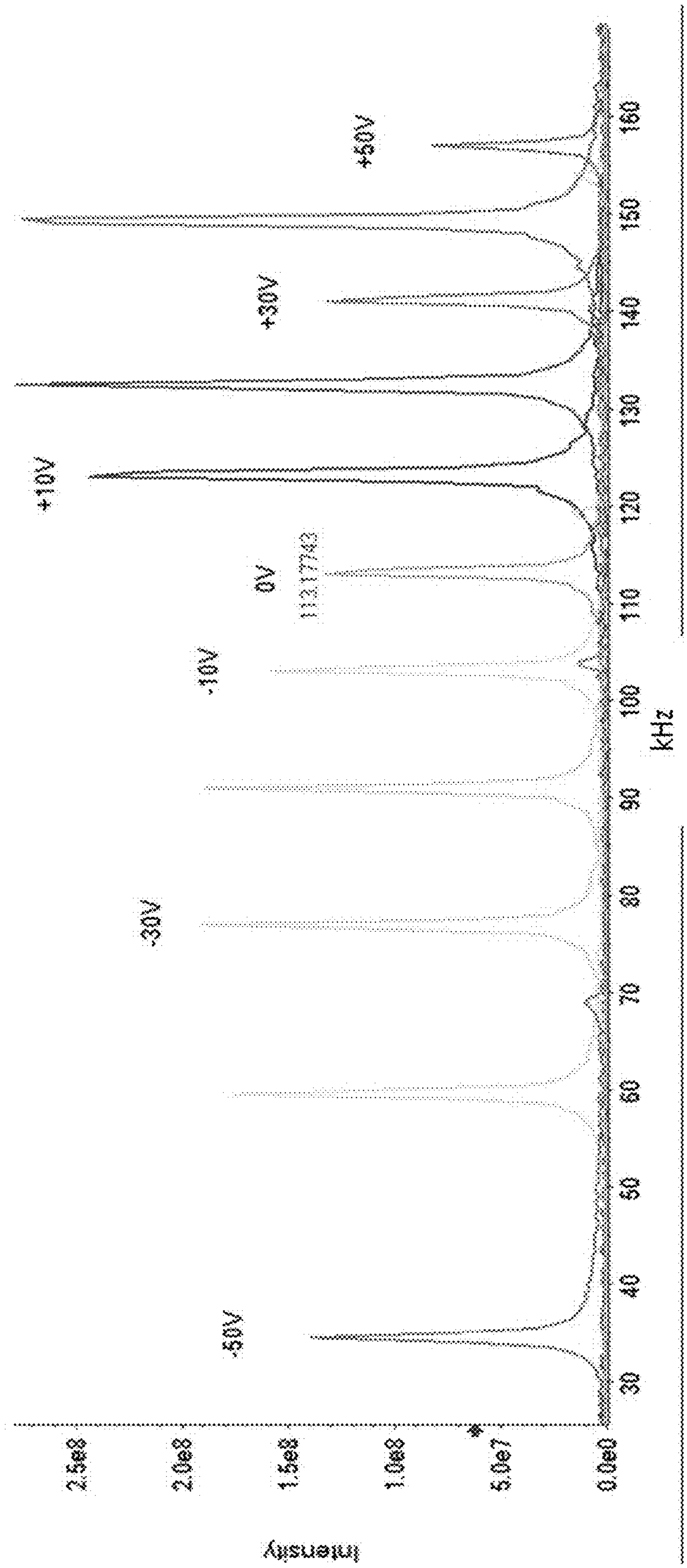
FIG. 7 is a plot depicting the frequency intensity of an ion having m/z 609 obtained under different radial confinement field conditions in accordance with various aspects of the present teachings.

As shown in FIG. 7, frequency spectra were produced from the continuous ion beam (e.g., by transforming the detected time-varying signal) while varying the resolving DC signal applied to the modified Q3. Each peak therefore represents the secular frequency of the detected 609 m/z ion at the indicated resolving DC voltages ranging from −50 V to 50 V (10 V increments shown above every other peak). For example, the peak located at a frequency of 113.2 kHz (obtained at 0 V DC) is very close to the theoretical secular frequency of 113.7 kHz calculated for an ion at m/z of 609.28 under the stated quadrupole conditions (e.g., parameter a=0). In light of this exemplary data and the methods and systems described herein, it will be appreciated that the mass spectra obtained under varying radial confinement conditions can be joined, with the confinement conditions being selected, for example, based on the total mass range to be measured, the complexity of the sample, and/or some other data-dependent condition, etc. Further, it will be appreciated that although the peak widths depicted in FIG. 7 are all about 1 kHz (FWHM), the frequency resolution (f/Δf) decreases as the ions' secular frequencies decrease. Thus, in accordance with certain aspects of the present teachings, moving to a higher secular frequency can also result in enhanced mass spectral resolution.

Those having ordinary skill in the art will appreciate that various changes can be made to the above embodiments without departing from the scope of the invention. Further, one of ordinary skill in the art would understand that the features of one embodiment can be combined with those of another.

What is claimed is:

1. A method of performing mass analysis, the method comprising:

passing an ion beam comprising a plurality of ions continuously through a quadrupole assembly having a quadrupole rod set extending from an input end for receiving the ions to an output end through which ions exit the quadrupole rod set, applying a first radial confinement signal to the quadrupole rod set so as to generate a first field for radially confining at least a first portion of the ions as they pass through the quadrupole rod set, before or after applying the first radial confinement signal, applying a second radial confinement signal to the quadrupole rod set so as to generate a second field for radially confining at least a second portion of the ions as they pass through the quadrupole rod set, wherein the second radial confinement signal comprises at least one of a different RF voltage and DC voltage to the rods of the quadrupole rod set relative to an RF voltage and a DC voltage of the first radial confinement signal, during the respective application of each of the first and second radial confinement signals, applying a voltage pulse across the quadrupole assembly so as to respectively excite radial oscillations of ions of the first and second portions at secular frequencies thereof, wherein fringing fields in proximity to said output end convert said radial oscillations into axial oscillations as said excited ions exit the quadrupole rod set, detecting said axially oscillating ions exiting the quadrupole rod set for each of the first and second radial confinement signals to respectively generate a first time-varying signal and a second time-varying signal, obtaining a Fourier transform of said first and second time-varying signals so as to generate a first frequency-domain signal and a second frequency-domain signal respectively, utilizing said first and second frequency-domain signals so as to generate a first mass spectrum of the detected ions and a second mass spectrum of the detected ions, and joining at least portions of the first and second mass spectra obtained under the first and second radial confinement signals.

2. The method of claim 1, wherein the first and second radial confinement signals differ in the amplitude of the RF voltages applied to the quadrupole rod set.

3. The method of claim 2, wherein the first and second radial confinement signals do not include a resolving DC voltage applied to the quadrupole rod set.

4. The method of claim 2, wherein the resolving DC voltage in the first and second radial confinement signals are identical and not zero.

5. The method of claim 1, wherein the first and second radial confinement signal differ in the resolving DC voltage applied to the quadrupole rod set.

6. The method of claim 5, wherein one of the first and second radial confinement signals does not include a resolving DC voltage applied to the quadrupole rod set.

7. The method of claim 5, wherein the amplitude of the RF voltages in the first and second radial confinement signals are identical.

8. The method of claim 1, wherein applying the voltage pulse across the quadrupole assembly comprises applying a dipolar voltage pulse across two of the rods of the quadrupole rod set.

9. The method of claim 1, wherein the quadrupole assembly further comprises a pair of auxiliary electrodes interposed between the rods of the quadrupole rod set, and wherein applying the voltage pulse across the quadrupole assembly comprises applying a dipolar voltage pulse across the auxiliary electrodes.

10. The method of claim 1, wherein the step of passing an ion beam through the quadrupole assembly is performed without trapping the ions therein.

11. A mass spectrometer system, comprising:

an ion source for generating an ion beam comprising a plurality of ions;

a quadrupole assembly having a quadrupole rod set extending from an input end for receiving the ions to an output end through which ions exit the quadrupole rod set;

one or more power sources configured to provide i) a radial confinement signal to the quadrupole rod set for generating a field for radial confinement of the ions as they pass therethrough, and ii) a voltage pulse across the quadrupole assembly so as to excite radial oscillations of at least a portion of the ions at secular frequencies thereof, wherein fringing fields in proximity to said output end convert said radial oscillations of at least a portion of said excited ions into axial oscillations as said excited ions exit the quadrupole rod set;

a detector for detecting at least a portion of said axially oscillating ions exiting the quadrupole rod set so as to generate a time-varying signal; and a controller configured to:

control the power sources so as to sequentially provide first and second radial confinement signals to the quadrupole rod set as the ion beam passes through the quadrupole assembly, wherein the first and second radial confinement signals differ in at least one of a RF voltage and a resolving DC voltage applied to the rods of the quadrupole rod set;

obtain a Fourier transform of said time-varying signal generated from the one or more voltage pulses applied while sequentially applying each of the first and second radial confinement signals so as to respectively generate first and second frequency-domain signals, utilize said first and second frequency-domain signals so as to generate first and second mass spectrum of the ions excited from the application of the voltage pulse and each of the first and second radial confinement signals respectively, and join at least portions of the first and second mass spectra.

12. The system of claim 11, wherein said quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis.

13. The system of claim 11, wherein the voltage pulse is applied across the rods of one of the first and second pairs of the quadrupole rod set.

14. The system of claim 11, further comprising a pair of auxiliary electrodes extending along the central longitudinal axis on opposed sides thereof, wherein each of the auxiliary electrodes is interposed between a single rod of the first pair of rods and a single rod of the second pair of rods, and wherein the voltage pulse is applied across the auxiliary electrodes.

15. The system of claim 11, wherein the first and second radial confinement signals differ in the amplitude of the RF voltages.

16. The system of claim 4, wherein the first and second radial confinement signals do not include a resolving DC voltage.

17. The system of claim 4, wherein the resolving DC voltage in the first and second radial confinement signals are identical and not zero, and optionally wherein the first and second radial confinement signals differ in the resolving DC voltage.

18. The system of claim 17, wherein one of the first and second radial confinement signals does not include a resolving DC voltage applied to the quadrupole rod set.

19. The system of claim 17, wherein the amplitude of the RF voltages in the first and second radial confinement signals are identical.

20. The system of claim 11, wherein the ion beam is passed through the quadrupole assembly without trapping the ions therein.

* * * * *